United States Patent [19]

Randall et al.

[11] 3,944,415

[45] Mar. 16, 1976

[54] REMOVING HEAVY METAL IONS FROM WATER

[75] Inventors: John M. Randall, El Cerrito; Earl Hautala, Martinez; Anthony C. Waiss, Jr., Pinole; Judith A. Kuhnle, Alameda, all of Calif.

[73] Assignee: The United States of America as represented by the Secretary of Agriculture, Washington, D.C.

[22] Filed: Mar. 5, 1975

[21] Appl. No.: 555,489

Related U.S. Application Data

[62] Division of Ser. No. 495,018, Aug. 5, 1974, Pat. No. 3,925,192.

[52] U.S. Cl. ............... 75/101 BE; 75/117; 75/119; 75/120; 75/121; 210/24; 210/39; 210/502; 75/118 R

[51] Int. Cl.$^2$ C22B 43/00; C22B 15/00; C22B 23/00
[58] Field of Search.... 75/101 BE, 121, 117, 118 R, 75/119, 120; 210/24, 39, 502

[56] References Cited

UNITED STATES PATENTS

| | | |
|---|---|---|
| 2,831,022 | 4/1958 | Van Blaricom et al........... 210/24 X |
| 3,719,473 | 3/1973 | Waiss et al............................ 75/121 |
| 3,725,261 | 4/1973 | Friedman................... 75/101 BE X |

*Primary Examiner*—G. Ozaki
*Attorney, Agent, or Firm*—M. Howard Silverstein; William Takacs; Max D. Hensley

[57] ABSTRACT

Heavy metal ions are removed from water by contact with formaldehyde-modified nut waste or tree bark.

4 Claims, No Drawings

REMOVING HEAVY METAL IONS FROM WATER

This is a division of our copending application, Ser. No. 495,018, filed Aug. 5, 1974, now U.S. Pat. No. 3,925,192.

DESCRIPTION OF THE INVENTION

This invention relates to and has among its objects the provision of a new method for removing mercury and other heavy metal ions from water. Further objects of the invention will be evident from the following description wherein parts and percentages are by weight unless otherwise specified. The abbreviation "ppm." means parts per million.

The law of conservation of matter states that matter cannot be created or destroyed. Thus, the total amount of heavy metals on and in the earth, whether in ionic, elemental, or organic form, is constant. For example, mercury is found naturally in oceans, seas, mines, rivers, lakes, mountains, etc. The mercury problem, therefore, is not one of existence but one of concentration and toxicity. It is the high toxicity of mercury compounds, especially methyl mercury, which makes the discharge of mercury into surface and ground waters so dangerous. The accumulation of mercury in particular areas results for the most part from man's use of this element in fungicides, insecticides, pharmaceuticals, etc. For instance, although the United States produces only 1/9 of the total world production of mercury, it uses ⅓ of the total world production. The discharge of industrial mercury wastes into rivers and lakes results in high concentrations of mercury in relatively small areas. Industry is faced with the task of disposing of mercuric wastes without expulsion into waterways.

Living organisms can tolerate mercury in minute concentrations without any toxic effects. However, there are certain bacteria in the mud and silt of our waters which readily convert both elemental and ionic mercury to methyl mercury. This form of mercury is water soluble and is readily ingested by plants, algae, lower forms of animal life, and, finally, by fish who feed on the aforementioned. In addition, methyl mercury is directly absorbed into the bodies of fish through the gills. The problem is this: Fish concentrate methyl mercury in their kidneys, liver, and their edible portions. Thus, a harmless situation becomes extremely hazardous. Fish can also directly transform elemental and ionic mercury to methyl mercury within their bodies. From these contaminated fish, mercury moves along to birds, chickens, etc., and ultimately, to man. As the mercury moves along in the food chain, it becomes more and more concentrated.

In humans mercury accumulates in the brain, kidney, liver, hair, blood, and the fetuses of pregnant women. In severe cases the damage is irreversible. Because mercury destroys the cells of the brain, permanent damage to the central nervous system can result. The proposed mercury standard for drinking water in the United States is 0.005 part per million. Brain damage can result from 20 parts per million, and this concentration may start a process leading to paralysis and death.

In U.S. Pat. No. 3,719,473 (hereinafter referred to as 3,719,473) by Waiss et al there is described a method for effective removal of mercury from water. The method involves contacting water containing mercury with a nut waste such as peanut skins, walnut expeller meal, peanut hulls, and the like. Although effective in removing mercury, the method of U.S. Pat. No. 3,719,473 has several disadvantages. The nut waste is generally highly-colored and this color is leached out by the water with which it is contacted. Thus, although mercury is removed from the water, the water becomes contaminated with the pigments from the nut waste. Furthermore, the water leaches out certain other organic compounds contained in the nut waste. The result is a substantial increase in the BOD of the water—A result which is ecologically unsatisfactory. Another problem is that nut waste exhibits structural instability on prolonged use. Thus when the material is subjected to treatment with large volumes of water, it physically disintegrates before it is saturated with heavy metal ions. In such case the nut waste, though still possessing the potential to absorb heavy metal ions, must be discarded. Furthermore, during the disintegration period the fines produced make it increasingly difficult to pass water through the mass of nut waste.

The invention described herein provides a means for obviating the problems outlined above. In accordance with the invention nut waste or tree bark is modified with formaldehyde prior to contact with water containing heavy metal ions. The formaldehyde-modified nut waste or tree bark is then used as described in U.S. Pat. No. 3,719,473. Thus, in a typical practice of the invention, water to be treated is passed through a bed of the formaldehyde-treated material contained in a suitable vessel. The effluent, no longer contaminated with heavy metal ions, can then be disposed of without harm to the environment.

In the process of the invention, the formaldehyde-modified nut waste or tree bark operates in the same manner and with the same efficiency as the non-modified product. Thus, the nut waste or tree bark acts as an absorbent in that heavy metals dissolved in the entering water as inorganic or organic compounds become bound to the waste or bark through chemical combination.

One advantage of the instant invention is that, although the modified material is as efficient as the unmodified material, water does not leach out pigments and other organic compounds. Thus, the effluent exhibits no increases in BOD. Another advantage is that the formaldehyde-modified nut waste or tree bark maintains its integrity even after prolonged use. In fact, physical integrity is retained up to and beyond the saturation point of the modified material. This is an extremely important attribute of the modified product and allows maximum efficiency in operations wherein it is used.

Another advantage of the invention is that it provides removal of even trace amounts of heavy metal ions. This is an important attribute. Conventional methods such as precipitation remove bulk amounts of ions but cannot remove trace amounts. Present environmental standards require removal of even these trace amounts, which are considered to be hazardous to the health of humans and other animals. Thus, for example, a typical mode of operation would be to precipitate, by conventional procedures, most of the heavy metal ions in the contaminated effluent and then to remove trace amounts of the ions by treatment in accordance with the instant invention.

In a practice of the invention, formaldehyde-modified peanut skins are preferably employed as the absorbent, and the use of this material is emphasized in the present description by way of illustration and not limitation. In its broad ambit the invention encompasses the use of formaldehyde-modified nut wastes of all kinds, for example, hulls, skins, woody shells, expeller meal, and pellicles of walnuts, peanuts, pecans, almonds, chestnuts, coconuts, and the like. The invention also encompasses the use of formaldehyde-modified tree barks of all kinds, for example, redwood bark, red oak bark, hemlock bark, etc. All of these substances have the ability to absorb a substantial quantity of heavy metal ions per unit weight of material even when modified with formaldehyde. Our investigations have shown, for example, that 100 parts of formaldehyde modified peanut skins will absorb 30 to 80 parts of mercury.

As mentioned above the invention is useful in removing and recovering heavy metal ions from water. Thus, the invention may be applied with equal success to water containing such heavy metal ions as mercurous and mercuric ions, silver ion, cadmium ion, cuprous and cupric ion, manganese ion, zinc ion, cobalt ion, nickel ion, lead ion, and the like.

As a first step in the practice of the invention, the starting material—peanut skins or other nut waste or tree bark—is modified by reaction with formaldehyde. The reaction is conducted in an aqueous system under acidic conditions. Typically, peanut skins (1 part) are mixed with about 10 parts of water containing about 0.5 to 1% of an acid such as sulphuric, hydrochloric or phosphoric. After the peanut skins have been mixed with the dilute acid, 15–20% (based on the weight of peanut skins) of formaldehyde is added. The mixture is stirred and then allowed to stand for 2–3 hours at 50°–70° C. Following this standing period the liquid is separated from the modified skins, which are washed and dried. The residual acidic liquid may be recharged with formaldehyde and used again as above. The dry modified peanut skins are ready for use as is or they may be ground prior to use in accordance with the invention. Alternatively, the peanut skins may be ground prior to treatment with formaldehyde.

The formaldehyde-modified peanut skins may be formed into a bed and the water containing heavy metal ions can be allowed to percolate therethrough. Alternately, the modified skins may be placed in a column and contaminated water can be pumped therethrough. It is obvious, of course, that the method of contacting the modified peanut skins with the water to be treated is not critical. Other methods will be suggested to those skilled in the art. The critical point is that contact be effected and maintained for a period long enough for the heavy metal impurities to be absorbed by the modified peanut skins. Generally, the gravity flow rate of the liquid through a column of modified peanut skins provides a sufficient contact time. The gravity flow rate of water through modified peanut skins ground to 1 mm in diameter is approximately 2 gallons per square foot per minute.

A particular advantage of the invention lies in the fact that it can be adapted easily to present water purification systems whether industrial or municipal. Since most water purification systems involve a filtration procedure, the addition of an extra filter containing formaldehyde-modified nut waste or tree bark would be routine.

EXAMPLES

The invention is further demonstrated by the following illustrative examples.

EXAMPLE 1

Preparation of Formaldehyde-modified Peanut Skins

Peanut skins were obtained from a local nut packer. One kilogram of unwashed peanut skins was mixed with 10 l. of 0.2 N $H_2SO_4$ and 500 g. of 35% aqueous formaldehyde was added. The mixture was stirred well and then was allowed to stand for 2 hours at about 50° C. The modified peanut skins were separated from the reaction liquid, washed with water, and then air-dried.

EXAMPLE 2

Removal of Mercuric Ion from Dilute Solution Using Formaldehyde-modified Peanut Skins A column 30 cm. in height and 12 mm. in inside diameter was packed with 5 g. of formaldehyde-modified peanut skins (prepared as in Example 1). The column was loaded with 495 ml. of an aqueous solution of mercuric acetate containing 1 mg. of mercuric ion per ml. The column was then washed with three 100-ml. portions of distiilled water. These washings were analyzed for mercuric ion content by atomic absorption, which is sensitive to 1 ppm. of mercuric ion. The results are summarized in the table below. To provide a point of reference a similar experiment was conducted with unmodified peanut skins.

| Absorbent | Mercuric ion applied (mg) | Mercuric ion concentration (ppm) | | | Total mercuric ion absorbed (mg) |
|---|---|---|---|---|---|
| | | 1st wash | 2nd wash | 3rd wash | |
| Formaldehyde-modified peanut skins | 495 | <1 | <1 | <1 | 495 |
| Unmodified peanut skins | 495 | <1 | <1 | <1 | 495 |

The effluent that passed through the column containing the formaldehyde-modified peanut skins was colorless whereas the effluent that passed through the unmodified skins had an intense reddish-brown color.

EXAMPLE 3

Removal of Nickel and Silver Ions from Dilute Solution by Contact with Formaldehyde-modified Peanut Skins A column 24 cm. in height and 25 mm. in inside diameter was packed with 16 g. of formaldehyde-modified peanut skins (prepared as in Example 1). The column was loaded with 3.5 l. of an aqueous solution of nickel chloride containing 20 mg. of nickel ion per liter or a total of 70 mg. of nickel ion. After the effluent had passed through the column, the column was washed with three 1-liter portions of distilled water. These washings and the effluent were analyzed for nickel ion content by atomic absorption.

A similar experiment was carried out with an aqueous solution of silver nitrate containing 197 mg. of silver ion per liter. A total of 3 l. of solution (537 mg. of silver ion) was passed through the column which was 35 cm. in height and 20 mm. in inside diameter and was packed with 20 g. of formaldehyde-modified peanut skins. The column was washed with distilled water as described above. Analysis was again made by atomic absorption, which is sensitive to 0.1 ppm. nickel ion and 0.01 ppm. silver ion.

The results of the above experiments are summarized in the table below.

| Ion applied | Amount (mg) | Concentration (ppm) Effluent | Wash | Total ion absorbed (mg) |
|---|---|---|---|---|
| Nickel | 70 | <0.1 | <0.1 | 70 |
| Silver | 537 | <0.01 | <0.01 | 537 |

EXAMPLE 4

Preparation of Formaldehyde-modified Hemlock Bark

Hemlock bark was ground to pass through a 1 mm. screen in a Wiley Mill. The ground material was screened further on a 0.295-mm. screen to remove fines.

One kilogram of the ground bark was mixed with a solution containing 10 l. of 0.2 N $H_2SO_4$ and 500 g. of 35% aqueous formaldehyde heated at 50° C. The mixture was stirred at 50° C. for one hour. The modified bark was separated from the reaction liquid, was washed with water, and was air-dried at 50° C. for 24 hours.

EXAMPLE 5

Removal of Lead Ion from Dilute Solution by Contact with Formaldehyde-modified Hemlock Bark A column 50 cm. in height and 20 mm. in inside diameter was packed with 45 g. of formaldehyde-modified hemlock bark (prepared as in Example 3). The column was loaded with 60 l. of an aqueous solution of lead nitrate containing 20 mg. of lead ion per liter or a total of 1200 mg. of lead ion. After the effluent was collected, the column was washed with three 1-liter portions of distilled water. These washings and the effluent were analyzed for lead ion content by atomic absorption, which is sensitive to 0.3 ppm. of lead ion. The results are summarized below.

| Ion applied | Amount (mg) | Concentration (ppm) Effluent | Wash | Total ion absorbed (mg) |
|---|---|---|---|---|
| Lead | 1200 | <0.3 | <0.3 | 1200 |

Having thus described our invention, we claim:

1. A method for removing dissolved heavy metal ions from water containing the same, which comprises contacting said water with a formaldehyde-modified nut waste, said nut waste being selected from the group consisting of nut hulls, skins, woody shells, expeller meals, and pellicles.

2. The method of claim 1 wherein the nut waste is peanut skins.

3. A method for removing dissolved heavy metal ions from water containing the same, which comprises contacting said water with formaldehyde-modified nut waste, said nut waste being selected from the group consisting of nut hulls, skins, woody shells, expeller meals, and pellicles, and being modified by reaction with 15–20% formaldehyde, based on the weight of nut waste, at 50°–70° C. for 2–3 hours under acidic conditions.

4. The method of claim 3 wherein the nut waste is peanut skins.

* * * * *